US012571686B2

(12) United States Patent
Foster

(10) Patent No.: US 12,571,686 B2
(45) Date of Patent: Mar. 10, 2026

(54) FIRE SYSTEM

(71) Applicant: Computionics Limited, Lancashire (GB)

(72) Inventor: Daniel William Foster, Manchester (GB)

(73) Assignee: Computionics Limited, Lancashire (GB)

( * ) Notice: Subject to any disclaimer, the term of this patent is extended or adjusted under 35 U.S.C. 154(b) by 350 days.

(21) Appl. No.: 18/198,901

(22) Filed: May 18, 2023

(65) Prior Publication Data

US 2024/0385053 A1     Nov. 21, 2024

(30) Foreign Application Priority Data

May 18, 2022     (GB) ..................................... 2207232

(51) Int. Cl.
| | |
|---|---|
| *G01K 1/20* | (2006.01) |
| *G01D 3/036* | (2006.01) |
| *G08B 29/18* | (2006.01) |
| *G08B 29/24* | (2006.01) |

(52) U.S. Cl.
CPC ............. *G01K 1/20* (2013.01); *G01D 3/0365* (2013.01); *G08B 29/185* (2013.01); *G08B 29/24* (2013.01)

(58) Field of Classification Search
None
See application file for complete search history.

(56) References Cited

U.S. PATENT DOCUMENTS

| | | | |
|---|---|---|---|
| 6,389,364 B1 | 5/2002 | Vyers | |
| 7,248,981 B2 * | 7/2007 | Mochizuki ............. | G01R 29/26 702/69 |
| 7,276,965 B1 * | 10/2007 | Sutardja .................... | H03F 1/34 330/99 |
| 7,304,536 B1 * | 12/2007 | Sutardja .................... | H03F 1/34 330/99 |
| 8,442,787 B2 * | 5/2013 | Ausserlechner ....... | G01N 27/72 702/65 |
| 8,640,441 B2 * | 2/2014 | Tylutki .................. | F02D 41/222 60/276 |

(Continued)

FOREIGN PATENT DOCUMENTS

| | | | | | |
|---|---|---|---|---|---|
| CN | 101802555 A | * | 8/2011 | .......... | G01D 3/0365 |
| CN | 102261922 A | * | 11/2011 | .......... | G01R 15/202 |

(Continued)

*Primary Examiner* — Kevin R Steckbauer
(74) *Attorney, Agent, or Firm* — Salter & Michaelson

(57) ABSTRACT

A correction system for a detector of a fire system, the correction system comprising: a calculation unit operable to calculate the $n+1^{th}$ order differential (wherein n is a whole number and $n \geq 1$) of an output of a sensor of the detector with respect to time; a measurement unit operable to measure the $n+1^{th}$ order differential to determine the extent of an initial curvature of a line of the output of a sensor of the detector with respect to time and a correction unit operable to correct an output of the sensor based on the measurement. The correction system can compensate for impairment of the sensor and results in more accurate sensor readings (and accordingly a more useful fire system).

25 Claims, 8 Drawing Sheets

(56) References Cited

U.S. PATENT DOCUMENTS

| | | | | |
|---|---|---|---|---|
| 9,341,499 | B2 | 5/2016 | Graf et al. | |
| 9,878,736 | B2* | 1/2018 | Taki | H04Q 9/04 |
| 2008/0224050 | A1* | 9/2008 | Thielemans | G01T 1/1647 |
| | | | | 250/362 |
| 2011/0270553 | A1* | 11/2011 | Ausserlechner | G01R 15/202 |
| | | | | 702/183 |
| 2013/0241540 | A1* | 9/2013 | Ausserlechner | G01D 3/036 |
| | | | | 324/226 |
| 2013/0327018 | A1* | 12/2013 | Tylutki | F02D 41/222 |
| | | | | 60/277 |
| 2015/0193565 | A1* | 7/2015 | Kim | G06F 30/367 |
| | | | | 703/2 |
| 2016/0362129 | A1* | 12/2016 | Taki | H04Q 9/04 |
| 2019/0044339 | A1* | 2/2019 | Ha | H02P 9/14 |
| 2023/0082948 | A1* | 3/2023 | Vigna Grap | F24F 11/39 |
| | | | | 702/50 |
| 2024/0280483 | A1* | 8/2024 | Utsugi | H01L 22/00 |
| 2024/0385053 | A1* | 11/2024 | Foster | G01D 3/0365 |

FOREIGN PATENT DOCUMENTS

| | | | | | |
|---|---|---|---|---|---|
| CN | 101802555 | B | * | 8/2012 | G01D 3/0365 |
| CN | 102261922 | B | * | 12/2014 | G01R 31/2829 |
| CN | 113630106 | A | * | 11/2021 | H03H 17/0255 |
| CN | 114911299 | A | * | 8/2022 | G05F 1/567 |
| CN | 114911299 | B | * | 10/2022 | G05F 1/567 |
| CN | 115307755 | A | * | 11/2022 | G06F 16/284 |
| CN | 118260523 | A | * | 6/2024 | G01D 21/00 |
| CN | 119600739 | A | * | 3/2025 | G08B 29/185 |
| EP | 2392898 | | | 7/2011 | |
| EP | 3 446 756 | | | 2/2019 | |
| EP | 3 658 239 | | | 2/2021 | |
| EP | 4280188 | A1 | * | 11/2023 | G08B 29/185 |
| GB | 2618811 | A | * | 11/2023 | G08B 29/185 |
| KR | 20220096605 | A | * | 7/2022 | G01K 15/005 |
| WO | 96/41318 | | | 12/1996 | |
| WO | WO-2023286220 | A1 | * | 1/2023 | G01N 21/8806 |
| WO | WO-2025143555 | A1 | * | 7/2025 | G16B 20/20 |

* cited by examiner

FIRE SYSTEM

TECHNICAL FIELD OF THE INVENTION

The present invention relates to a correction system for a detector of a fire system and a method of correcting a detector of a fire system.

BACKGROUND TO THE INVENTION

Detectors for fire systems detect specific environmental conditions to determine whether a fire is in progress and therefore whether to indicate a detection event. A variety of sensors can be used, and multi-detectors can use several different types of sensors. Heat sensors, for example thermistors, detect the temperature of the environment and the associated detector will trigger when a set temperature or specific rate of rise (or higher rate of rise) of temperature is detected. Optical and ionization sensors detect the amount of smoke in an environment, and the associated detector triggers when a specific amount of smoke is detected. A carbon monoxide sensor detects the amount of carbon monoxide in an environment and the associated detector triggers when a specific amount of carbon monoxide is detected.

In response to the detection event the fire system may sound an alarm or alert and/or release a fire suppressant such as water, carbon dioxide, or firefighting foam via sprinklers or another suitable delivery system. To reduce the chances of a fire alarm or fire suppressant device failing to trigger at the appropriate time, it is important that the measurement of the environmental condition or its rate of rise is as close to possible to the actual value of the environmental condition or its rate of rise. Otherwise, there may not be enough time for people in the building of the fire system to safety evacuate, or it may be less likely that the suppressant is released early enough to successfully suppress the fire.

The design of any sensor for a detector of a fire system will mean the measurement of the environmental condition by the sensor will lag behind the actual value of the environmental condition. As an example, for heat sensors this lag can be introduced by the thermal mass of the sensor itself. For all types of sensors it can also be introduced by the set-up of the detector causing a delay in the environmental condition (heat, smoke, carbon monoxide) reaching the sensor, and/or by a shadowing effect. FIG. 1 shows an example of a thermistor in an environment experiencing a 30° C. per minute heat rise, the figure showing the lag between the measured temperature and actual temperature.

This lag can be compensated for by using a sensor with a better response time, or an exposed detector (in which the sensor is exposed to the environment) instead of an enclosed detector (in which the sensor is enclosed in housing, with openings in the housing such that the environmental condition can reach the sensor). However, this can increase costs (due to the sensor with a better response time), increase the risk of the sensor being damaged or contaminated (due to now being exposed), and in any case may not fully solve the problem (since no sensor will be perfect, for instance shadowing can still occur for exposed detectors and indeed is more pronounced).

An alternative solution is to calculate, in factory settings, the first order differential of the output of the sensor with respect to time and the first order differential of the actual value of the environmental condition with respect to time, determine the difference between the two first order differentials and thereby set up the algorithm of the detector to compensate the output of the sensor based on the difference.

While this solution is satisfactory for factory conditions, it does not suffice in real-world conditions. Sensors in real-world conditions can be impaired due to many factors, including physical damage, dust build up, cobwebs, being covered either deliberately or otherwise, misuse or poor setup, or due to changes introduced into the environment which obscure the environmental condition (for example, the introduction of shelving in a room). Such impairment is shown in FIG. 2, in the difference between the output of the sensor over time with the actual temperature over time. Given sub-optimal conditions are specific to the respective real-world setting of the detector, it cannot be compensated for when setting the detector up in the factory. The above discussed method also cannot be used in a real-world setting, since the detector will have no way to know the actual environmental condition or rate of change (unlike in factory settings, where environmental conditions can be carefully controlled).

Embodiments of the present invention seek to overcome/ameliorate these or other disadvantages.

SUMMARY OF THE INVENTION

According to a first aspect of the present invention there is provided a correction system for a detector of a fire system, the correction system comprising: a calculation unit operable to calculate the $n+1^{th}$ order differential (wherein n is a whole number and $n \geq 1$) of an output of a sensor of the detector with respect to time; a measurement unit operable to measure the $n+1^{th}$ order differential to determine the extent of an initial curvature of a line of the output of a sensor of the detector with respect to time and a correction unit operable to correct an output of the sensor based on the measurement to compensate for impairment of the sensor.

It has been realised that the extent of the initial curvature of the line of the output of the sensor with respect to time (before the line becomes approximately linear) is dependent upon the level of impairment of the sensor. The extent is generally the same regardless of the level of the environmental condition or its rate of change. By taking a higher order differential (i.e. higher than the first order) it is possible to obtain a measurement representing the extent of this curvature which discerns the particular level of impairment to a sufficient degree and which can be obtained quickly enough to be useful to correcting the output of the sensor. As such, the correction system can compensate for impairment of the sensor and results in more accurate sensor readings (and accordingly a more useful fire system).

The measurement unit may be operable to measure an element of the line of the $n+1^{th}$ order differential which indicates the extent of initial curvature of the output of the sensor with respect to time. The measurement unit may be operable to measure a time period of an element of the line of the $n+1^{th}$ order differential which indicates the extent of initial curvature of the output of the sensor with respect to time. The measurement unit may be operable to measure the time taken for a curve of a line of the $n+1^{th}$ order differential to relax. The measurement unit may be operable to measure the time taken for an initial curve of a line of the $n+1^{th}$ order differential to relax. The curve may be a log-normal curve. The measurement unit may be operable to measure the time taken for the curve of the $n+1^{th}$ order differential to relax from a turning point. The measurement unit may be operable to measure the time taken for the curve of the $n+1^{th}$ order differential to reach a relaxation point. The measurement unit may be operable to measure the time taken for the curve of the $n+1^{th}$ order differential to reach a relaxation point from a turning point. The measurement unit may be operable to measure the time taken for the curve of the $n+1^{th}$ order differential to reach a relaxation point from an earliest turning point. The measurement unit may be operable to measure the time taken for the curve of the $n+1^{th}$ order differential to reach a relaxation point from an extremum turning point. The turning point may be a minimum. The relaxation point may be the point at which the curve reaches a set percentage of the differential value at the turning point. The set percentage may be 40%. The set percentage may be 95%. The set percentage may be set in accordance with the fire detector's physical design.

By measuring the time taken for the curve of the $n+1^{th}$ order differential to reach a set percentage of the differential value at the turning point, a balance can be struck between obtaining a measurement which accurately represents the extent of the initial curvature of the line of the output of the sensor with respective to time and obtaining a measurement quickly enough to be useful for correcting the output.

The time period from zero to the turning point can be similar for differing levels of impairment. This being the case, measuring the time taken from the turning point to the relaxation point more clearly distinguishes measurements of different levels of impairment from each other.

The calculation unit may be operable to calculate the $n^{th}$ order differential of the output of the sensor of the detector with respect to time. The calculation unit may be operable to calculate the first order differential of the output of the sensor of the detector with respect to time. The calculation unit may be operable to calculate the second order differential of the output of the sensor with respect to time. The calculation unit may be operable to calculate the third order differential of the output of the sensor of the detector with respect to time. The measurement unit may be operable to measure the first order differential to determine the extent of an initial curvature of a line of the output of a sensor of the detector with respect to time. The measurement unit may be operable measure the second order differential to determine the extent of an initial curvature of a line of the output of a sensor of the detector with respect to time. The measurement unit may be operable measure the third order differential to determine the extent of an initial curvature of a line of the output of a sensor of the detector with respect to time.

Measuring the second order differential strikes a balance between having a measurement which discerns the particular level of impairment to a sufficient degree and the time taken for successive order differentials to be calculated.

The calculation unit may be operable to perform a differential filter to the output of the sensor with respect to time to obtain the $n+1^{th}$ order differential. The calculation unit may be operable to perform a differential filter to the output of the sensor over with respect to time to obtain the first order differential. The calculation unit may be operable to determine the $n+1^{th}$ order differential from the $n^{th}$ order differential. The calculation unit may be operable to perform differential filters to successive order differentials until obtaining the $n+1^{th}$ order differential. The calculation unit may be operable to perform a differential filter to the first order differential to obtain the second order differential. The calculation unit may be operable to use a differential-difference engine to generate the differential filter.

The correction unit may be operable to correct the output of the sensor if the measurement is above a set value. This prevents corrections being made when the levels of impairment are so low that they are not a significant factor in the shape of the line and so can be ignored.

The correction unit may be operable to change the output of the sensor proportionally to a scale of the measurement.

The correction unit may be operable to correct the output of the sensor if the time measurement is above a set time value. The set time value may be 60 seconds. The correction unit may be operable to determine an excess time, the excess time being the time measurement minus the set time value. The correction unit may be operable to correct the output of the sensor by adding a correction value. The correction value may vary with time. The correction value may be dependent upon the excess time. The correction value may be the multiple of the square of the excess time with the $n^{th}$ order differential. The correction value may be the multiple of the square of the excess time with the first order differential.

The sensor may be a heat sensor. The heat sensor may be a thermistor. The sensor may be a carbon monoxide sensor. The sensor may be an optical sensor. The sensor may be an ionisation sensor.

The detector may be a multi-sensor device, wherein the sensor is one of several sensors. The several sensors may include any and/or all of the following: optical sensor, ionisation sensor, carbon monoxide sensor, and/or heat sensor.

The fire system may be either or both a fire prevention system and/or a fire suppression system.

According to a second aspect of the present invention there is provided a fire system comprising a detector and the correction system of the first aspect.

The fire system may be operable to trigger a detection event on the basis of the corrected output of the sensor. The fire system may be operable to trigger a detection event if the corrected output of the sensor is at or above a level trigger value. The fire system may be operable to trigger a detection event if the rate of change of the corrected output of the sensor is at or above a rate trigger value.

The second aspect of the present invention may have any and/or of the optional features of the first aspect, as desired and/or appropriate.

The fire system may be operable to deploy carbon dioxide, water, firefighting foam and/or any other fire suppressant. The correction system may form part of the detector. The correction system may be part of a computing unit of the detector. The correction system may be the computing unit of the detector carrying out an algorithm. The computing unit may be a controller.

According to a third aspect of the present invention there is provided a detector for a fire system comprising the correction system of the first aspect.

The detector may be operable to trigger a detection event on the basis of the corrected output of the sensor. The detector may be operable to trigger a detection event if the corrected output of the sensor is at or above a level trigger value. The detector may be operable to trigger a detection event if the rate of change of the corrected output of the sensor is at or above a rate trigger value.

The detector may be an exposed detector. The detector may be an enclosed detector.

The detector may be the fire system.

The third aspect of the present invention may have any and/or of the optional features of the first aspect, as desired and/or appropriate.

The correction system may be part of a computing unit of the detector. The correction system may be the computing unit of the detector carrying out an algorithm. The computing unit may be a controller. The correction system may be a fire panel.

According to a fourth aspect of the present invention there is provided a method of correction for a detector of a fire system, the method of correction comprising: calculating the $n+1^{th}$ order differential (wherein n is a whole number and n≥1) of an output of a sensor of the detector with respect to time; measuring the $n+1^{th}$ order differential to determine the extent of an initial curvature of a line of the output of a sensor of the detector with respect to time; and correcting an output of the sensor based on the measurement to compensate for impairment of the sensor.

It has been realised that the extent of the initial curvature of the line (before the line becomes approximately linear) of the output of the sensor with respect to time is dependent upon the level of impairment of the sensor. The extent is generally the same regardless of the level of the environmental condition or its rate of change. By taking a higher order differential (i.e. higher than the first order) it is possible to obtain a measurement representing the extent of this curvature which discerns the particular level of impairment to a sufficient degree and which can be obtained quickly enough to be useful to correcting the output of the sensor. As such, the method of correction can compensate for impairment of the sensor and results in more accurate sensor readings (and accordingly a more useful fire system).

An element of the line of the $n+1^{th}$ order differential which indicates the extent of initial curvature of the output of the sensor with respect to time may be measured. A time period of an element of the line of the $n+1^{th}$ order differential which indicates the extent of initial curvature of the output of the sensor with respect to time may be measured. The time taken for a curve of the line of the $n+1^{th}$ order differential to relax may be measured. The time taken for an initial curve of the line of the $n+1^{th}$ order differential to relax may be measured. The initial curvature and/or curve may be a log-normal curve. The time taken for the curve of the line of the $n+1^{th}$ order differential to relax from a turning point may be measured. The time taken for the curve of the line of the $n+1^{th}$ order differential to reach a relaxation point may be measured. The time taken for the curve of the line of the $n+1^{th}$ order differential to reach a relaxation point from a turning point may be measured. The time taken for the curve of the line of the $n+1^{th}$ order differential to reach a relaxation point from an earliest turning point may be measured. The time taken for the curve of the line of the $n+1^{th}$ order differential to reach a relaxation point from an extremum turning point. The turning point may be a minimum. The relaxation point may be the point at which the curve reaches a set percentage of the differential value at the turning point. The set percentage may be 40%. The set percentage may be 95%.

By measuring the time taken for the curve of the $n+1^{th}$ order differential to reach a set percentage of the differential value at the turning point, a balance can be struck between obtaining a measurement which accurately represents the extent of the initial curvature of the line of the output of the sensor with respective to time and obtaining a measurement quickly enough to be useful for correcting the output.

The time period from zero to the turning point can be similar for differing levels of impairment. This being the case, measuring the time taken from the turning point to the relaxation point more clearly distinguishes measurements of different levels of impairment from each other.

The $n^{th}$ order differential of the output of the sensor of the detector with respect to time may be calculated. The first order differential of the output of the sensor of the detector with respect to time may be calculated. The second order differential of the output of the sensor with respect to time may be calculated. The third order differential of the output of the sensor of the detector with respect to time may be calculated. The first order differential may be measured to determine the extent of an initial curvature of a line of the output of a sensor of the detector with respect to time. The second order differential may be measured to determine the extent of an initial curvature of a line of the output of a sensor of the detector with respect to time. The third order differential may be measured to determine the extent of an initial curvature of a line of the output of a sensor of the detector with respect to time.

Measuring the second order differential strikes a balance between having a measurement which discerns the particular level of impairment to a sufficient degree and the time taken for successive order differentials to be calculated.

Calculating may comprise performing a differential filter to the output of the sensor with respect to time to obtain the $n+1^{th}$ order differential. Calculating may comprise performing a differential filter to the output of the sensor over with respect to time to obtain the first order differential. Calculating may comprise determining the $n+1^{th}$ order differential from the $n^{th}$ order differential. Calculating may comprise performing differential filters to successive order differentials until obtaining the $n+1^{th}$ order differential. Calculating may comprise performing a differential filter to the first order differential to obtain the second order differential. Calculating may comprise using a differential-difference engine to generate the differential filter.

The output of the sensor may be corrected if the measurement is above a set value. This prevents corrections being made when the levels of impairment are so low that they are not a significant factor in the shape of the line and so can be ignored.

The output of the sensor may be corrected if the time measurement is above a set time value. The set time value may be 60 seconds. Correcting may comprise determining an excess time, the excess time being the time measurement minus the set time value. The correction unit may be operable to correct the output of the sensor by adding a correction value. The correction value may vary with time. The correction value may be dependent upon the excess time. The correction value may be the multiple of the square of the excess time with the $n^{th}$ order differential. The correction value may be the multiple of the square of the excess time with the first order differential.

The sensor may be a heat sensor. The heat sensor may be a thermistor. The sensor may be a carbon monoxide sensor. The sensor may be an optical sensor. The sensor may be an ionisation sensor.

The detector may be a multi-sensor device, wherein the sensor is one of several sensors. The several sensors may include any and/or all of the following: optical sensor, ionisation sensor, carbon monoxide sensor, and/or heat sensor.

The fire system may be either or both a fire prevention system and/or a fire suppression system.

DETAILED DESCRIPTION OF THE INVENTION

In order that the invention may be more clearly understood one or more embodiments thereof will now be described, by way of example only, with reference to the accompanying drawings, of which:

Figure 1:
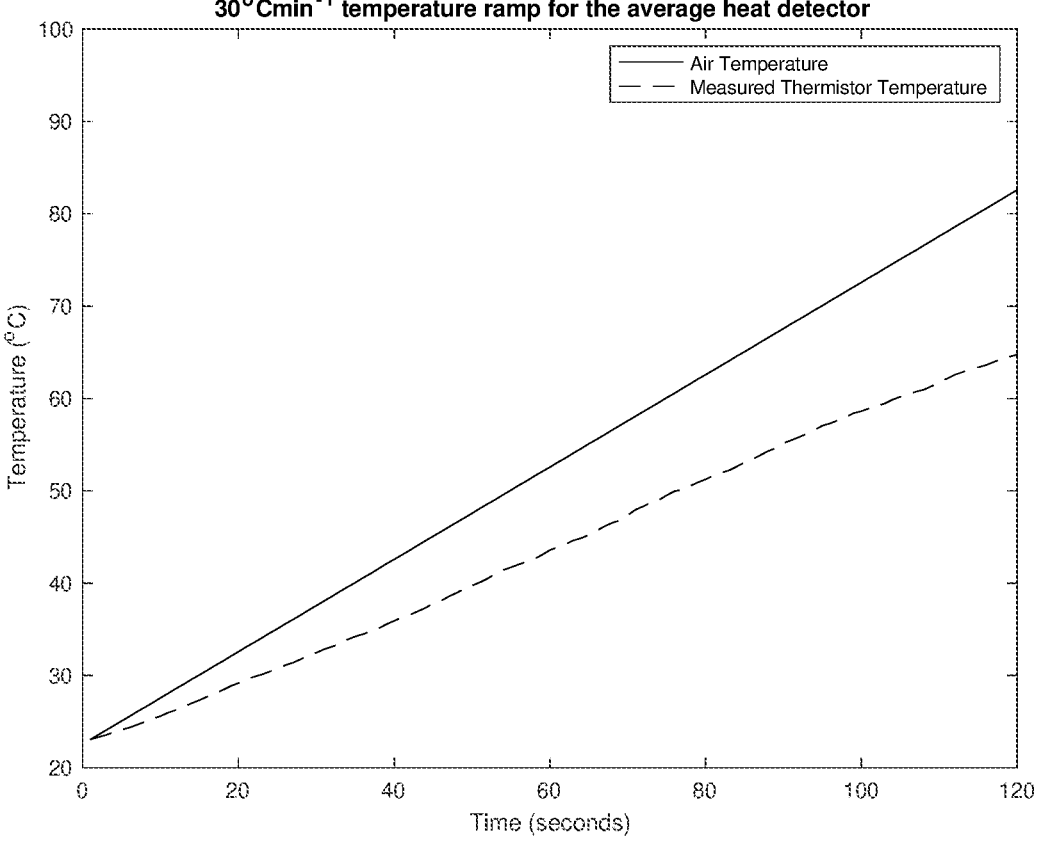
FIG. 1 shows temperature with respect to time in an environment in which there is a 30° C. per minute rise, as measured by a thermistor and the actual air temperature.
Figure 2:
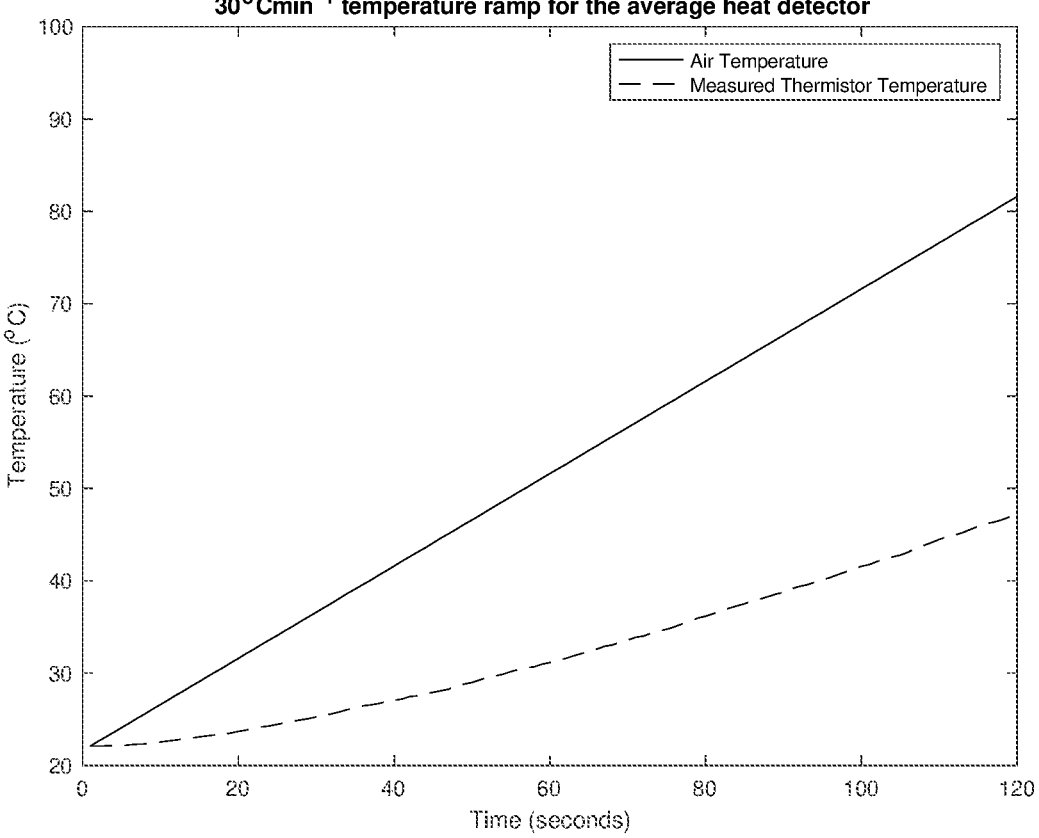
FIG. 2 shows temperature with respect to time in an environment in which there is a 30° C. per minute rise, as measured by a thermistor which is impaired and the actual air temperature.
Figure 3:
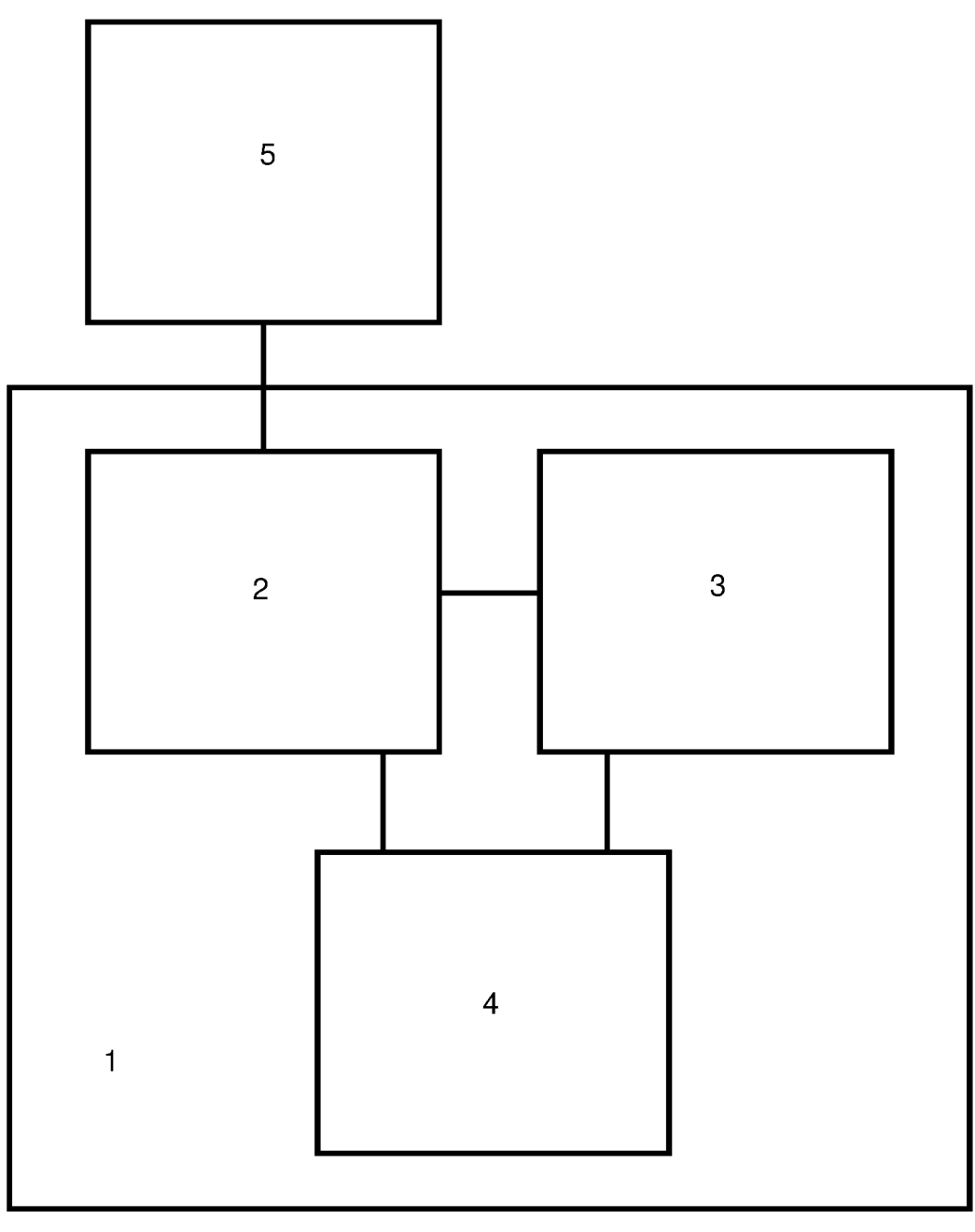
FIG. 3 shows a correction system for a detector of a fire system and a sensor of the detector.

As shown in FIG. 3, the correction system 1 for the detector of a fire system comprises a calculation unit 2, a measurement unit 3 and a correction unit 4. In use the correction system 1 receives the output of the sensor 5 of the detector, before it is passed to the rest of the detector for actioning (i.e. determining if the value of the environmental condition and/or the rate of change of the environmental condition indicates a detection event should be triggered). The correction system 1 can be a computing unit such as a controller of a detector implementing an algorithm, or alternatively can be a computing unit of the fire system, which governs the detector, implementing an algorithm.

Figure 4:
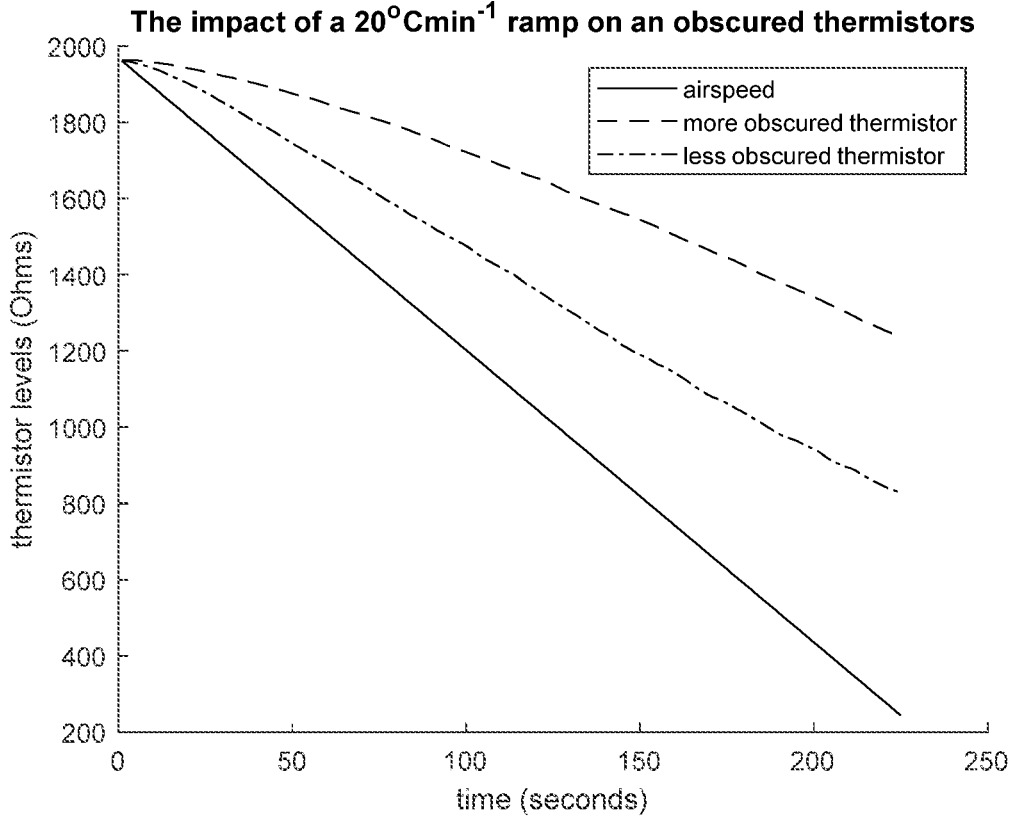
FIG. 4 shows outputs over time for a first sensor which is less impaired and a second sensor which is more impaired, as well as the ideal output which would match the actual temperature over time, in an environment with a 20° C. per minute rise.

Examples of the output of a type of sensor 5, a thermistor, can be seen in FIG. 4. This figure shows outputs over time for a first sensor which is less impaired and a second sensor which is more impaired, as well as the ideal output which would match the actual temperature over time.

Figure 5:
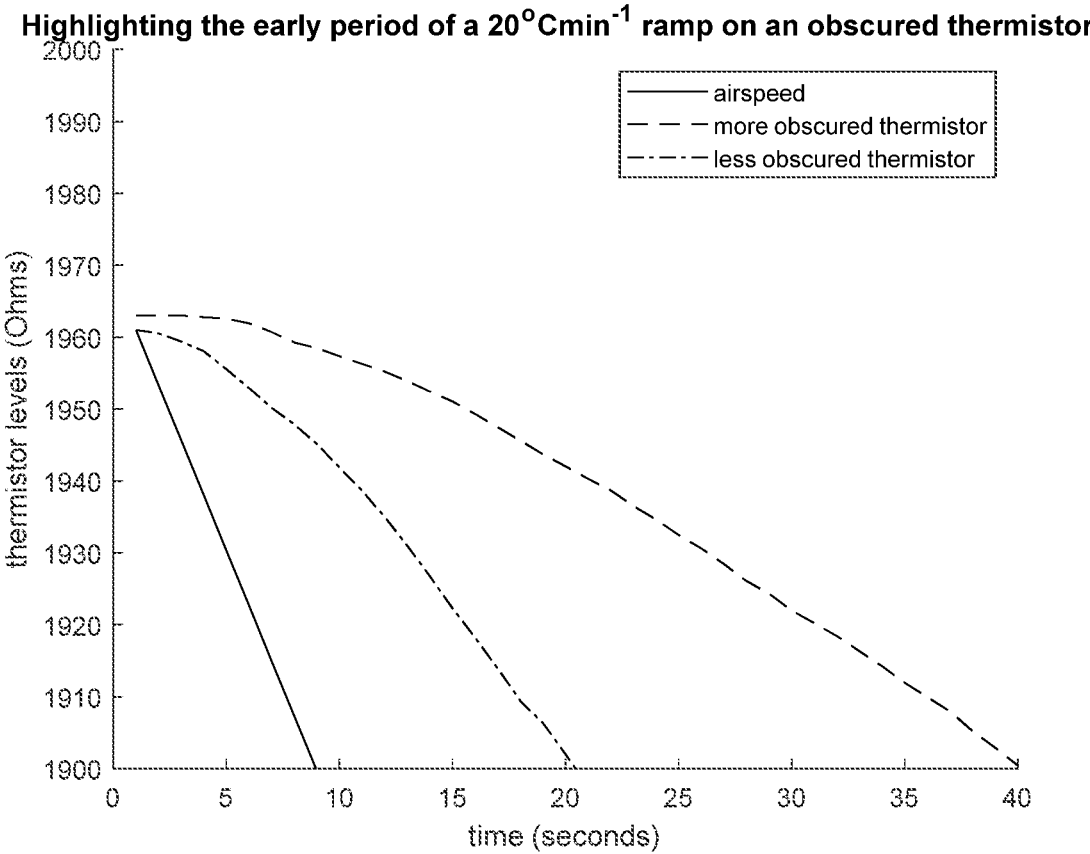
FIG. 5 shows the outputs and ideal output of FIG. 4 over a shorter time scale.
Figure 6:
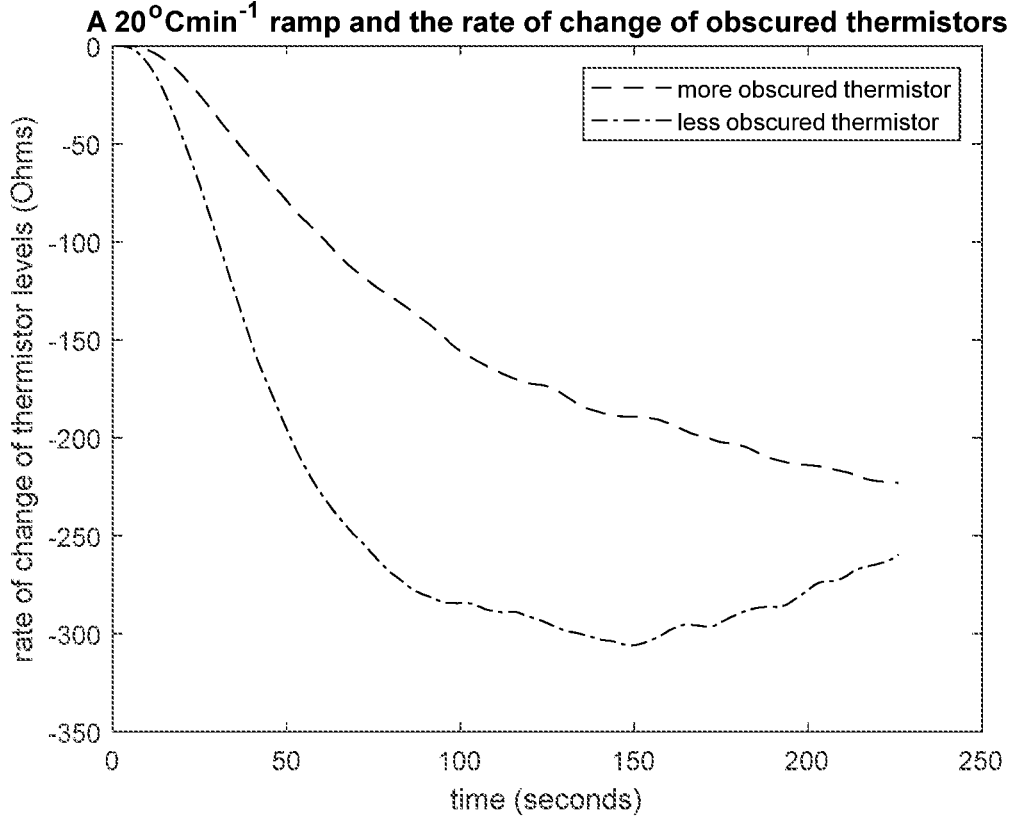
FIG. 6 shows the first order differentials of the outputs with respect to time of the first and second sensors of FIG. 4.

As can be seen in FIG. 4, and more clearly in FIG. 5 which shows just the same outputs over a shorter time scale, the line of the first sensor has a smaller extent of initial curvature than the second sensor, before both lines become approximately linear. The calculation unit 2 receives this output over time from the sensor 5 and applies a differential filter to it to calculate the first order differential of the output with respect to time. The result of applying such a differential filter to the outputs of FIG. 4 can be seen in FIG. 6.

Figure 7:
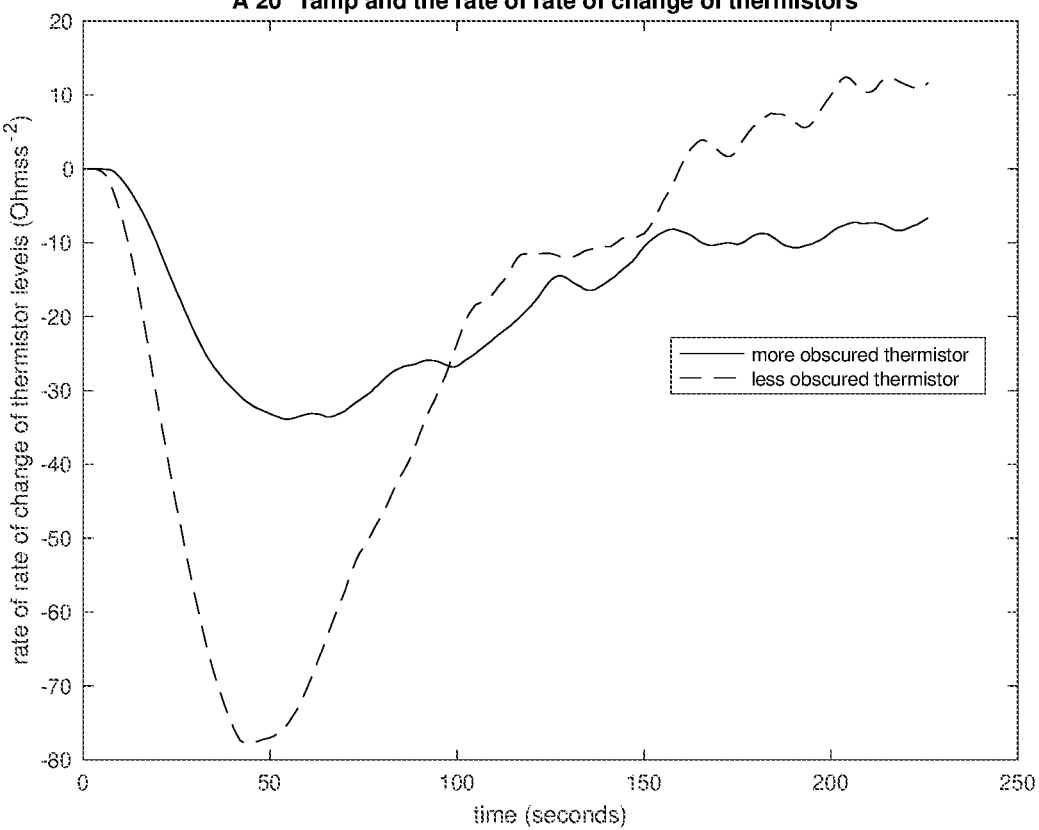
FIG. 7 shows the second order differentials of the outputs with respect to time of the first and second sensors of FIG. 4.

The calculation unit 2 then applies a differential filter to the first order differential, to obtain the second order differential. The second order differentials for the first and second sensors can be seen in FIG. 7. The second order differential is then measured by the measurement unit 3.

In alternative embodiments the calculation unit 2 can continue to perform differential filters to successive order differentials, to obtain the third or higher order differential. In these alternative embodiments it is the highest order differential which the measurement unit 3 measures, rather than the second order differential.

Figure 8:
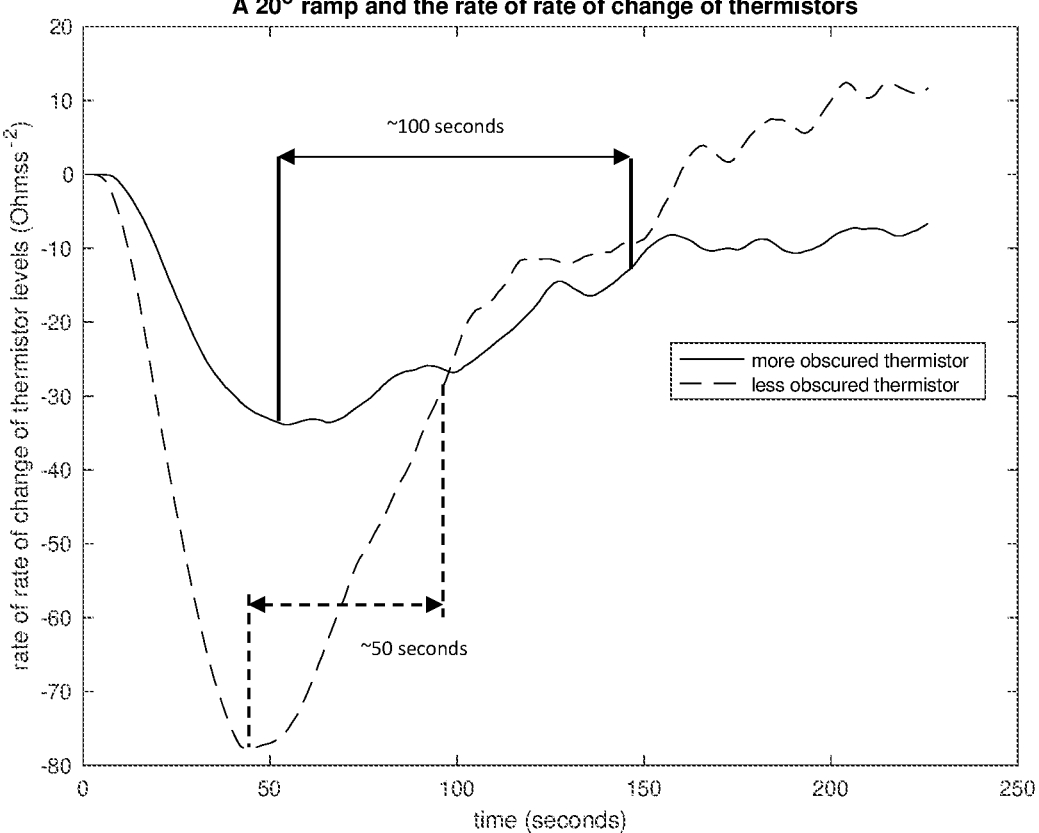
FIG. 8 shows the second order differentials of FIG. 7, and the measured time periods for each.

The measurement unit 3 measures a time period of the element of the second differential which indicates the extent of the initial curvature of the output with respect to time. In the case of the second order differential the measurement unit 3 measures the time taken for the line to go from its minimum point to a set percentage of the differential value at the minimum point. In the example shown in FIG. 8, the set percentage is 40% of the differential value, although in other embodiments the set percentage can be higher or lower.

Once the time period is measured, the correction unit 4 can correct the output of the sensor 5 based on the time period. In the embodiment, the correction unit 4 determines if the time period is above a set time value, in this case 60 seconds. If the time period is below the set time value, the correction unit 4 does not alter the output of the sensor 5 and it is passed to the rest of the detector unchanged for determining if a detection event should be triggered.

If the time period is greater than the set time value, the correction unit 4 determines the excess time, which is the time period minus the set time value. The excess time is then squared, multiplied by the first order differential, and then added to the output of the sensor (i.e. the squared excess time is multiplied with each first order differential value at each particular time, and each result is added to the output at the respective time). The resulting corrected output of the sensor is closer to the value representing the actual value of the environmental condition.

The detector then determines if a detection event has occurred based on the corrected output, resulting in a more accurate detector. If a detection event has occurred the fire alarm and/or suppression system will be triggered, as appropriate.

The one or more embodiments are described above by way of example only. Many variations are possible without departing from the scope of protection afforded by the appended claims.

The invention claimed is:

1. A correction system for a detector of a fire system, the correction system comprising: a calculation unit operable to calculate an $n+1^{th}$ order differential of an output of a sensor of the detector with respect to time, wherein n is a whole number and n≥1; a measurement unit operable to measure the $n+1^{th}$ order differential to determine the extent of an initial curvature of a line of the output of the sensor of the detector with respect to time; and a correction unit operable to correct the output of the sensor based on the measurement to compensate for impairment of the sensor.

2. A correction system as claimed in claim 1 wherein the measurement unit is operable to measure an element of the line of the $n+1^{th}$ order differential which indicates the extent of initial curvature of the output of the sensor with respect to time.

3. A correction system as claimed in claim 2 wherein the measurement unit is operable to measure a time period of an element of the line of the $n+1^{th}$ order differential which indicates the extent of initial curvature of the output of the sensor with respect to time.

4. A correction system as claimed in claim 3 wherein the measurement unit is operable to measure the time taken for a curve of a line of the $n+1^{th}$ order differential to relax.

5. A correction system as claimed in claim 2 wherein the initial curvature and/or curve is approximately a log-normal curve.

6. A correction system as claimed in claim 5 wherein the measurement unit is operable to measure the time taken for the curve of the line of the $n+1^{th}$ order differential to relax from a turning point.

7. A correction system as claimed in claim 5 wherein the measurement unit is operable to measure the time taken for the curve of the line of the $n+1^{th}$ order differential to reach a relaxation point.

8. A correction system as claimed in claim 7 wherein the measurement unit is operable to measure the time taken for the curve of the line of the n+1$^{th}$ order differential to reach a relaxation point from an extremum turning point.

9. A correction system as claimed in claim 7 wherein the turning point is a minimum.

10. A correction system as claimed in claim 7 wherein the relaxation point is the point at which the curve reaches a set percentage of the differential value at the turning point.

11. A correction system as claimed in claim 10 wherein the set percentage is 40%.

12. A correction system as claimed in claim 1 wherein the calculation unit is operable to calculate the second order differential of the output of the sensor with respect to time.

13. A correction system as claimed in claim 12 wherein the measurement unit is operable to measure the second order differential to determine the extent of the initial curvature of the line of the output of the sensor of the detector with respect to time.

14. A correction system as claimed in claim 1 wherein the correction unit is operable to correct the output of the sensor if the measurement is above a set value.

15. A correction system as claimed in claim 14 wherein the correction unit is operable to correct the output of the sensor if the time measurement is above a set time value.

16. A correction system as claimed in claim 15 wherein the correction unit is operable to determine an excess time, the excess time being the time measurement minus the set time value.

17. A correction system as claimed in claim 16 wherein the correction unit is operable to correct the output of the sensor by adding a correction value.

18. A correction system as claimed in claim 17, wherein the correction value is dependent upon the excess time.

19. A correction system as claimed in claim 18 wherein the correction value is the multiple of the square of the excess time with the n$^{th}$ order differential.

20. A correction system as claimed in claim 18 wherein the correction value is the multiple of the square of the excess time with the first order differential.

21. A fire system comprising a detector and the correction system according to claim 1.

22. A fire system of claim 21 wherein the fire system is operable to trigger a detection event on the basis of the corrected output of the sensor.

23. A detector for a fire system comprising the correction system according to claim 1.

24. A detector according to claim 23 wherein the detector is operable to trigger a detection event on the basis of the corrected output of the sensor.

25. A method of correction for a detector of a fire system, the method of correction comprising: calculating an n+1$^{th}$ order differential of an output of a sensor of the detector with respect to time, wherein n is a whole number and n≥1; measuring the n+1$^{th}$ order differential to determine the extent of an initial curvature of a line of the output of the sensor of the detector with respect to time; and correcting the output of the sensor based on the measurement to compensate for impairment of the sensor.

* * * * *